United States Patent [19]

Skaperda

[11] 3,912,873

[45] Oct. 14, 1975

[54] MULTIPLE FAULT TOLERANT DIGITAL SWITCHING SYSTEM FOR AN AUTOMATIC TELEPHONE SYSTEM

[75] Inventor: Nikola J. Skaperda, Delaware, Ohio

[73] Assignee: North Electric Company, Galion, Ohio

[22] Filed: Jan. 17, 1974

[21] Appl. No.: 434,268

[52] U.S. Cl. .......... 179/18 FC

[51] Int. Cl.² .......... H04M 3/00

[58] Field of Search .......... 179/18 ES, 18 FC, 18 GF, 179/15 BF; 340/172.5

[56] References Cited

UNITED STATES PATENTS

| | | | |
|---|---|---|---|
| 3,492,435 | 1/1970 | Inose | 179/18 FC |
| 3,585,306 | 6/1971 | Battocletti | 179/15 AQ |
| 3,648,256 | 3/1972 | Paine | 340/172.5 |
| 3,699,529 | 10/1972 | Beyers | 340/172.5 |
| 3,778,555 | 12/1973 | Nordling | 179/18 FC |

OTHER PUBLICATIONS

Fundamental Principles of Switching Circuits and Systems, published by AT&T, pp. 397–404.

*Primary Examiner*—Ralph D. Blakeslee
*Attorney, Agent, or Firm*—Johnson, Dienner, Emrich & Wagner

[57] ABSTRACT

A digital switching arrangement having equipment interconnected to provide multiple fault tolerances in the digital switching of PCM (Pulse Code Modulated) data over time division multiplex lines. The digital switching arrangement includes a set of peripheral units interconnected via a switching network. The set of peripherals includes input/output facilities such as digital trunks, analog trunks, and subscriber lines and also includes control processors and related common control equipment. Peripheral units are connected to the switching network over digital links. The digital links carry multiplexed PCM data and serve as the exclusive interface between the outside world and the switching network. The multiplexed content of the digital links is further interleaved on superhighways within the switching network in such a manner as to uniformly distribute traffic as well as increase system reliability. Time-space-time switching is performed between incoming and outgoing superhighways over a modular time-space-time switch.

29 Claims, 5 Drawing Figures

MULTIPLE FAULT TOLERANT DIGITAL SWITCHING SYSTEM FOR AN AUTOMATIC TELEPHONE SYSTEM

BACKGROUND OF THE INVENTION

1. Field of the Invention

This invention relates to time division communictions systems for switching multiplexed data. The invention more particularly relates to a digital switching arrangement comprised of equipment interconnected so as to provide multiple fault tolerance in the switching of PCM (Pulse Code Modulated) data over time division multiplex lines.

2. Description of the Prior Art

A common practice in communications systems in general and telephone systems in particular, is to establish a solid connection between a calling (using standard telephony terminology) line and a called line via a path which is associated individually and uninterruptedly with the connection for the duration of a call. Thus a quantity of equipment, dependent on the number of lines served and the expected frequency of service, is provided in a common pool from which portions may be chosen and assigned to a particular call. Such a system arrangement if referred to as "space separation" in which privacy of conversation is assured by the separation of individual conversations in space.

In contrast, telephone systems have been developed which operate on a time separation basis in which a number of conversations share a single path. Privacy of conversations is assured in such systems by separation of individual conversations in time. Thus each call is assigned to the common path for an extremely short but rapidly and periodically recurring interval and the connection between any two lines in communication is completed only during these short intervals often referred to as channels or time slots.

Telephone systems are also known which combine space and time division techniques.

It is a common practice in prior art telephone systems to sample analog signals from a plurality of lines or trunks and to convert the sampled signals into PCM code words. The PCM code words are then multiplexed onto a single digital link (transmission line) having a plurality of channels. Each channel, as indicated above, is an identifiable time period on the line and occurs once in every time frame. Known prior art systems typically have twenty-four channels per time frame and speed information for twenty-four independent lines or trunks may be transmitted during each time frame.

PCM information may be switched among multiplex lines by selectively transferring PCM data words from the various channels of an input multiplex line to a plurality of output multiplex lines. Transfer of data words from input multiplex lines to output multiplex lines may be accomplished by means of a multistage network employing the time division, space division, or a combination of the time and space division techniques alluded to above.

It is a common practice in prior art systems to further multiplex the content of a plurality of digital links into a "superhighway" to reduce network wiring requirements and effectively utilize the switching capability (primarily speed) of the switching network.

Heretofore the reliability of switching systems has been a significant problem. In particular, the problem of "disabled" calls, i.e. those calls which may not be completed due to system faults, has commanded the attention of many inventors.

System faults that may result in call disablement may have their origin at any one of a number of critical points in both the switching process and system apparatus. For example, it is a common practice in telephone systems to interconnect a number of subscriber lines via a line switch onto a digital link. The analog to digital conversion that must be performed in encoding speech for transmission over the link is commonly performed by a channel bank. Each channel bank typically services a plurality of subscriber lines. It has been the case that when a channel bank becomes inoperative, all of the subscribers interconnected to the network via the channel bank lose service. It is known that the encoding and decoding of signals between subscribers and a digital link could be performed on a per line basis to obviate the problems inherent in a shared channel bank failure; however, heretofore, per line encoding and decoding has not been economically feasible.

Still another example of a system fault that may occur and result in call disablement is the loss of one or more superhighways which interconnect groups of digital links to the switching network. In prior art systems the loss of a superhighway would generally disable the access of many subscribers to the switching network and hence completely disable many telephone calls.

In addition to the potential fault locations set out above, other critical fault locations exist in time shared space division networks. For example, switching through the switching network itself is generally performed under the control of a centralized common control unit, typically comprising a processor, a data memory, and associated input/output equipment. Telephone calls might again be disabled if the common control as a whole or in part becomes inoperative.

An obvious technique for increasing system reliability and minimizing call disablement is to construct a telephone switching system laden with redundant or "spare" parts. If a primary portion of such a network fails, a redundant or secondary portion of the system is activated in place of the primary to prevent the disablement that would have been occasioned by the loss of the primary. Clearly the cost of providing and maintaining complete redundancy in a communications system is exorbitant. Cost and maintance are thus two important factors which prevent redundancy from appearing as a viable solution to the system fault tolerance problem.

Telephone calls may also become disabled due to system congestion as well as a result of outright equipment failure. Congestion results in what are termed as "blocked" telephone calls, i.e. calls that cannot be completed because the resources in the telephone system for the completion of such calls have been exhausted. For example, blocking will result if no path is available through the space division portion of a switching network during a given time slot.

Techniques for overcoming blocking in the switching network itself, and in particular in a switching matrix, are now well known. For example, one technique is to provide a nonblocking time division network having twice as many switchable channels than multiplexed channels. Thus, to service multiplex lines having n channels per frame, the network must have 2n time slots during a period of time which is equivalent to one frame. Obviously, only 50% of channel capacity is utilized according to this technique and is therefore not economical.

Another technique for overcoming blocking in the switching network is to provide a nonblocking network in which each incoming multiplex line is given two appearances. It is clear that such an arrangement becomes impractical in large systems due, for example, to the higher cost of such a network.

It is now known that networks having predetermined, almost nonblocking characteristics can be built and that such networks are considerably less expensive than completely nonblocking networks. In large systems the economic advantage gained by using such a less expensive blocking network is substantial.

It is an object of this invention to increase system reliablility in a time division switching system employing a time shared switching network having a predetermined, almost nonblocking characteristic.

It is a further object of this invention to provide a multiple fault tolerant switching system which in the event of a plurality of system faults will continue to provide communication services.

It is still a further object of this invention to lower the cost of achieving a highly reliable switching system by minimizing expensive redundancy, minimizing wiring cost, and providing a modular system that can be built to any desired size depending on traffic and space requirements.

Still further objects of the invention include remove control of switch operations at one geographic center by equipment located at a distance switching centr and emergency telephone service in the event of certain grave system failures.

SUMMARY OF THE INVENTION

According to the invention a set of peripheral units is interconnected via a switching network. The set of peripherals includes input/output facilities such as digital trunks, analog trunks, and subscriber lines and also includes control processors and related common control equipment. Peripheral units are connected to the switching network over digital links. The digital links carry multiplexed PCM data and serve as the exclusive interface between the outside world and the switching network. The multiplexed content of digital links is further interleaved on superhighways within the switching network in such a manner as to uniformly distribute traffic and thereby increase system reliability. Time-space-time switching is performed between incoming and outgoing superhighways over a modular time-space-time switch.

According to the invention all interface with the switching network is over digital links. These links may, for example, be standard T1 telephone lines manufactured by Western Electric Company. For the sake of illustration it will be assumed herein that all interface with the switching network to be disclosed is over T1 lines. Furthermore, according to the invention, all input to the switching system is to be in a standard code format. Without limiting the choise of format, D2-D3 PCM format will be assumed herein for illustrative purposes. Lines carrying D2-D3 PCM formatted data may be directly input to the switching network. Lines or trunks carrying any other form of data will first have to be converted to D2-D3 PCM format before being input to the switching network.

According to the invention a certain number, N, of peripherals may be interconnected to the switching network via a single line swtich. N equals 512 in the preferred embodiment to be set out herein. The line switch serves to concentrate (expand) signals from peripheral units into (from) a mutually independent pair of T1 lines which are the access paths to the switching network. It should be noted that a plurality of line switches may be interconnected to the network via a single pair of T1 lines. The number of line switches connected to a single T1 line pair is variable and may be readily determined as a function of expected traffic distribution over a geographical area. Within each line switch analog to digital and digital to analog conversion is performed on a per line basis. This per line encoding and decoding provides increased system reliability since, for example, the failure of a single analog to digital or digital to analog conversion unit affects only the line on which the unit is attached and not a plurality of lines as would be the case using shared channel banks. It should be noted that per line analog to digital and digital to analog conversion also allows digital data to be directly multiplexed into a T1 line through a line switch. Digital data terminals producing 8-bit formatted data simply do not require analog to digital or digital to analog conversion units to be located in the line switch circuitry which service the digital data terminal lines.

As stated above, each line switch is interconnected to the switching network via a completely independent pair of T1 lines. Thus if one of the T1 lines of a pair fails, peripherals attached to the line switch do not lose total access to the network.

Hence, provision is made at the remote line switch level for two aspects of the system reliability. These two aspects are (1) access by peripherals not being precluded by a single analog to digital or digital to analog converter failure and (2) access to the switching network not being precluded by a single T1 line faiure.

The focal point of the digital switching network is the network itself which interconnects literally all parts of the system together. As stated above, the interface between the network and the outside world is standardized and in accordance with the preferred embodiment of the invention, being set out herein, is a set of T1 lines. Similarly, all terminals and outside connections such as operator desks, maintenance panels, test panels, common control memories and I/0 devices, are connected to the switching network via another standard interface, the aforementioned line switch in the same manner as subscriber lines are connected to the network.

The switching network itself is defined to comprise a pair of subnetworks. A subnetwork comprises multiplexing equipment for multiplexing the contents of groups of digital links into superhighways, and further comprises time slot interchangers and a switching matrix for performing time-space-time switching. Each subnetwork is independent from the other and is under the control of a common control unit comprised of a control processor, memory and I/0 devices. Thus another aspect of system reliability is provided, namely, that a fault occurring in a given subnetwork will not prevent the independent operation of another subnetwork.

Connections may also be routed via both subnetworks in a pair. Intranetwork links between subnetworks are provided for such connections.

Every line switch has access to both swtiching subnetworks in a network pair via the pair of T1 lines connecting the line switch to the network and via intranetwork links. The first choice in establishing the connection will be always in one subnetwork. Only if all paths are busy a second attempt will be routed via the other subnetwork in a pair. This practically means that only overflow traffic will be routed between the subnetworks in a pair using the intranetwork links. The internal blocking in the subnetworks are almost zero and can be neglected so that the major blocking source will be on the T1 lines toward the line switch for trunks. Assuming a very low blocking probability in the subnetworks, the only significant blocking in the network is on these transmission T1 lines. It is important to point out that due to the time division switching the cost of the network is relatively low so that one can more readily afford to provide the extra links between subnetworks needed for a very low blocking probability at a reasonable cost.

According to the preferred embodiment of the invention up to forth T1 lines might be multiplexed onto four superhighways. For reliability reasons, as well as even traffic distribution, it is much better if a group of T1 lines is multiplexed not over single superhighway, but over a group of superhighways. According to the preferred embodiment of the invention, every T1 line from a group of forty T1 lines has access to four superhighways. Six fixed channels from every T1 line are assigned to each one of the four superhighways. A superhighway has the capability of carrying up to 256 channels of data. Only 240 channels of data from the forty grouped T1 lines will be carried on each of the four superhighways. The remaining sixteen channels may be used as expansion in the switch to decrease blocking and for control or signaling purposes.

It should be noted that if one superhighway from the group fails all channels on that superhighway will be lost, but such loss will only increase the probability of blocking over the affected T1 lines. Not a single T1 line will be completely lost. For example, if one superhighway fails the traffic offered to a line switch will be forty-two channels instead of forty-eight. If the original traffic was calculated as, for example, 30 erlangs with 0.001% blocking, the offered traffic after the error might still be 30 erlangs but with a blocking probability of 1%. Thus faults will at most cause only a degradation in traffic handling capacity and not a total loss of service.

Thus, another aspect of system reliability is provided for at the T1 line, superhighway interface level. Namely, with respect to the set of peripherals interconnected to a given superhighway, degradation of service is merely a possibility upon the loss of the superhighway, as opposed to a complete loss of service with certainty as was the case in the prior art. It may be observed that spare superhighways could further minimize the possibility of a degradation in traffic handling capacity by absorbing traffic from a faulty superhighway.

It should be noted that according to the invention every superhighway is independent of every other superhighway. In particular, each superhighway is controlled by a separate controller which performs all necessary functions for the superhighway including marker, call supervision, scanning, path search, emergency number service, and receiver/sender functions. These independent superhighway controllers effect a form of decentralized control since they perform functions that were typically performed by prior art centralized common control on a multi-superhighway basis. This decentralized control is another aspect of system reliability since the failure of one superhighway controller effects only the one superhighway. Additionally, these independent superhighway controllers allow the switching matrix associated with a set of superhighways to be modular. In particular, a row of crosspoints in the switching matrix is associated with a given superhighway controller. There is no common part in the switching matrix which serves more than one superhighway.

A superhighway, together with its controller, row of crosspoints associated with the controller, input time slot interchanger, output time slot interchanger, crosspoint control memory and crosspoint address decoder, comprises what will be designated herein as a "switch group."

Still further in accordance with the preferred embodiment of the invention, the common control processor directly accesses the switching matrix over standard T1 lines. This in itself simplifies interfacing wiring problems. One or more channels may be dedicated in every superhighway for the so-called control function. A control processor may directly access the controllers associated with each superhighway via this control channel(s). Data may be incoming from the processor to the switching matrix during any channel. In the input time slot interchanger, the incoming channel is switched into the dedicated control channel. This gives an additional flexibility to the system because in the case of errors any channel from any T1 line can be used as a control channel.

It should be noted that in cases of processor faults, since two processors are connected to the two subnetworks of a network pair and the subnetworks are interconnected via intra network links, a fault in either processor is not fatal. In this case either processor can take over and control the two subnetworks. According to the invention, another aspect of system reliability is provided in that, for example, a remote common control processor can control a local subnetwork pair via a standard T1 line interface in case both of the processors typically associated with the subnetwork pair are unavailable or inoperative.

Overall, the system being disclosed is modular. Thus if traffic requires more switching capability than two subnetworks provide, a multinetwork configuration may be constructed. The links between the subnetworks in different network pairs are designated as inter network links. According to the preferred embodiment of the invention, the inter network links, like all other links into a network, are T1 lines.

Still further, according to the invention, emergency service is to be provided in the event of grave system failure, such as, common control breakdown. Subscribers are to always have access to such numbers as police, fire, ambulance, etc., via the switching system. Decentralized control, even without the common control, provides this emergency service.

It is a feature of this invention that the interface with the switching network is standardized and comprises a uniform digital link, such as an all T1 line interface.

It is a further feature of this invention that all peripherals (except control processors) are connected to the switching network via another standard interface, the line switch or the channel bank. Thus, for example, no peripherals are directly connected to a common control processor, i.e., the processor "talks" to other parts of the common control via digital links to and through the switching network.

It is another feature of this invention that subnetwork switching matrices are interconnected over standard digital links.

It is still a further feature of this invention that remote communications and remote control are possible. Any common control processor can control any network however remote via digital links and thus, for example, common control resources can be shared over wide geographic areas.

Still other features of this invention include highly reliable switching with a minimum of expensive redundancy, increased reliability through per line A/D and D/A converters located remotely in line switches, modular network construction requiring a minimum amount of wiring, decentralized control and, emergency service provisions in the event of common control failure through redimentary service provision on the modular switch group level enabling special numbers such as police, fire, ambulence, etc., to be in reach at any time.

BRIEF DESCRIPTION OF THE DRAWINGS

These and other features of the present invention will be more readily apparent from the following detail description taken in conjunction with the accompanying drawing.

DETAILED DESCRIPTION

In order to more fully understand the principles of the invention, an illustrative embodiment will be set out which comprises a multiple-fault tolerant telephone switching system. The illustrative embodiment being restricted to a telephony example in no way limits the invention, for, as will be obvious to those skilled in the art, the principles to be set out herein are equally applicable to communications systems in general.

It will be assumed, for illustrative purposes, that all input to the switching network is to be in a standard code format. Without limiting the choice of format, D2-D3 PCM format code which exhibits mu 255 encoding characteristics is assumed. According to the preferred embodiment, to be set out herein, lines carrying D2-D3 PCM formatted data exhibiting mu 255 encoding characteristics may be directly input to the switching network. D2-D3 PCM code is explained in "D2 Channel Bank-Systems Aspects" by H. H. Henning and J. W. Pan in the October, 1972, Bell System Technical Journal and in "The D3 Channel Bank" by Gaunt and Evans in the August, 1972, Bell Labs. Record. Mu 255 code is explained by H. Kaneko in an article entitled "A Unified Formulation of Segment Companding Laws and Synthesis of Codecs and Digital Companders," September, 1970, Bell System Technical Journal.

Lines or trunks carrying any other types of signals will have to be converted to D2-D3 PCM format before being input to the switching network. Methods and apparatus for converting data to D2-D3 PCM format may readily be devised by those skilled in the art and constitute no part of the instant invention.

Figure 1:
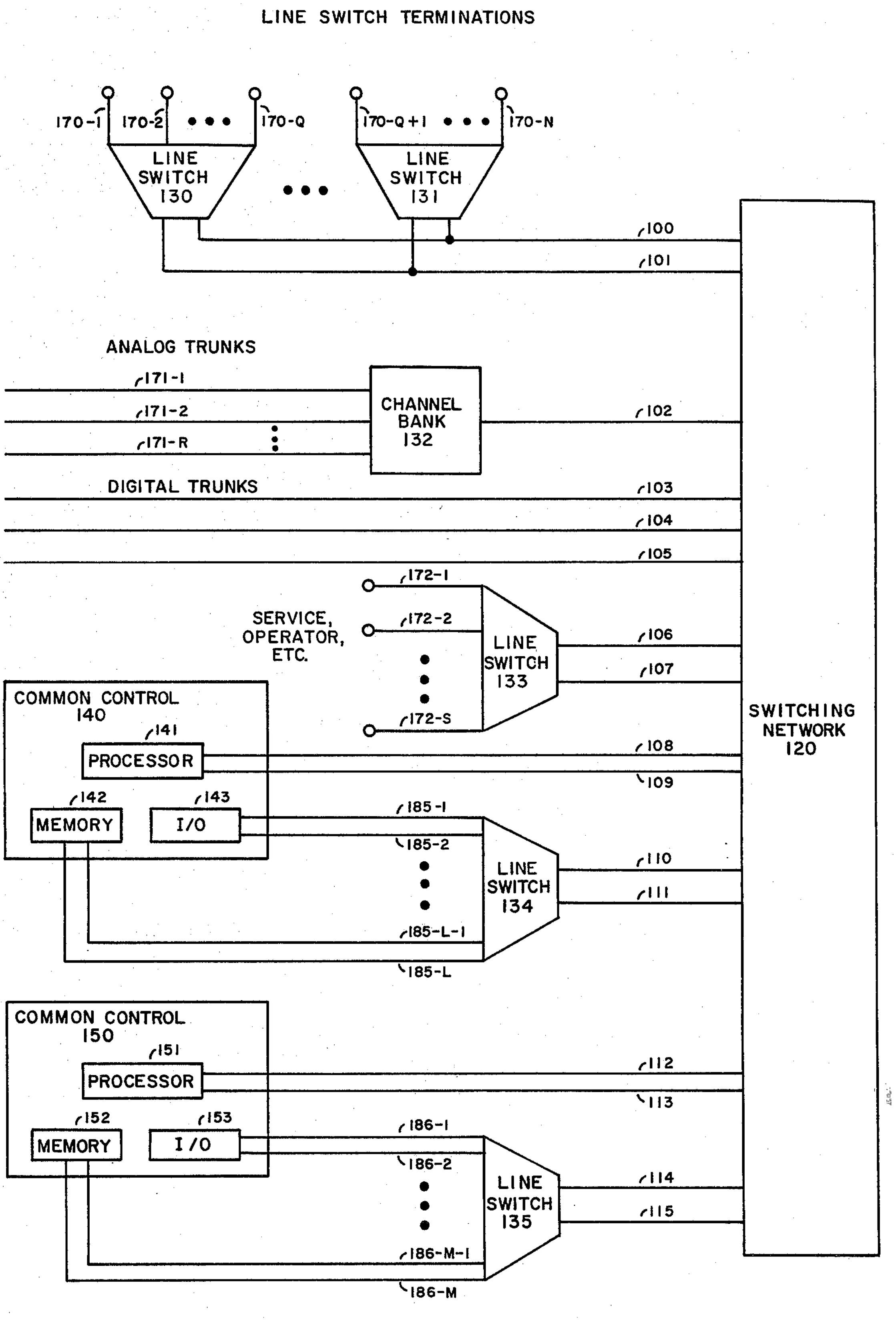
FIG. 1 depicts a multiple fault tolerant telephone switching system built in accordance with the principles of the invention.

FIG. 1 depicts a multiple-fault tolerant telephone switching system built in accordance with the principles of the invention.

According to the preferred embodiment of the invention a set of peripheral units is interconnected via switching network 120. The set of peripherals includes input/output facilities, such as digital trunks 103, 104, and 105, analog trunks 171-1, 171-2, . . . , 171-R, where R is an integer, and, for example, subscriber lines, data sets, etc. which may be attached to any or all the depicted line switch termination nodes 170-1 through 170N where N is an integer.

Also included in the set of peripherals are asynchronous common control processors. Two such processors are depicted in FIG. 1 as devices 141 and 151. Related common control equipment such as memory 142, memory 152, I/0 device 143 and I/0 device 153 belong to the set of peripherals interconnected by network 120. FIG. 1 further depicts common control 140 as comprising units 141, 142, and 143. Common control 150 is also shown in FIG. 1 and comprises units 151, 152, and 153.

Common control 140 and common control 150 are substantially identical. The common control hardware organization displayed in FIG. 1 is equivalent to the common control hardware organization in existing processor controlled switching systems with asynchronous control except that each common control device is independently connected to the switching network via digital links. It should be noted that no two common control devices are intrconnected, communications between said devices being established only via network 120. An example of a system with a processor control (asynchronous) suitable for use in accordance with this invention is the North Electric Company NXIE processor. The NXIE processor is described in U.S. Pat. No. 3,727,192, which issued Apr. 10, 1973 to Cheney et al. and which is hereby incorporated by reference.

Functionally, common control devices 140 and 150 perform only a subset of the functions performed by the NXIE common control. This is by virtue of decentralized control in the network structure of the instant invention. This decentralized control feature will be expounded upon in detail hereinafter.

Other peripherals which may be interconnected to network 120 are depicted in FIG. 1. For example, operator desks, coin boxes, test terminals, and miscellaneous services, etc., may be interconnected to network 120 via line switch termination nodes 172-1 through 172-S, whereas S is an integer.

Q, N, and S, referred to above as integers, are realistically upperbounded based on traffic considerations over the type of digital link chosen for service. According to the preferred embodiment of the invention, 512 is chosen as the upper limit on these variables. It is to be understood that choosing 512 as the upper limit on these variables is strictly for illustrative purposes herein and in no way is intended to limit the invention.

It should be noted that all peripheral units find eventual access to network 120 exclusively over digital links. The digital links are shown as links 100 through 115 in FIG. 1 and constitute an all T1 network interface. These links, as stated above, may be standard T1 telephone lines manufactured by Western Electric Company. Each T1 line may carry twenty-four channels of multiplexed PCM data. It should be noted that T1 lines physically comprise twisted pairs of wires and in fact carry twenty-four channels simultaneously in two directions, namely, to and from network 120.

Assuming D2-D3 PCM formatted data exhibiting mu 255 encoding characteristics on digital trunks 103, 104, and 105, these trunks, as shown in FIG. 1 and as indicated above, may be input directly to switching network 120.

According to the preferred embodiment of the invention, line switches, as a general rule, serve as the interface between T1 lines which directly access network 120 and the line switch termination nodes used to interconnect peripheral devices. Functionally, a line switch is the remote part of subscriber loop multiplex (SLM) system with per line encoding performed on an analog input to produce the required D2-D3 PCM formatted code. As stated above, according to the preferred embodiment of the invention, this D2-D3 PCM formatted code exhibits mu 255 encoding characteristics and is output to a pair of T1 lines.

SLM systems in general belong to the prior art and, for example, are explained in "Digital Multiplexer for Expanded Rural Service" by I. M. McNair, Jr. in the Bell Laboratories Record dated March, 1972. However, to facilitate a greater understanding of the operation of the line switch, in the context of the preferred embodiment of the invention, details on line switch operation will now be set out.

As stated above, the line switches perform an interfacing function. In effect the line switch concentrates data from the line switch termination nodes onto a completely independent pair of T1 lines. Conversely, the line switch serves to expand data from an independent pair of T1 lines onto the line switch termination nodes. (Recall that each T1 line serves as both an access and return path from network 120). It should be noted that a plurality of line switches may be interconnected to the switching network via a single pair of T1 lines. For example, in FIG. 1, line switches 130 and 131 are shown interconnected to switching network 120 via T1 lines 100 and 101. As stated above, the number of line switches as well as the total number of terminals connected to a single T1 line pair, is variable and may be readily determined as a function of expected traffic.

In addition to its concentration (expansion) function, the line switch performs per line analog to digital encoding (and per line digital to analog decoding) whenever analog signals appear (or are to appear) on a line switch termination node. Methods and apparatus for performing per line analog to digital conversion to produce D2-D3 PCM code exhibiting mu 255 encoding characteristics are set out in copending patent application Ser. No. 385,095, filed Aug. 2, 1973. Methods and apparatus for performing the complementary digital to analog conversion of such code are set out in copending application Ser. No. 402,342, filed Oct. 1, 1973. These appliations are hereby incorporated by reference.

The per line encoding and decoding of analog signals provides increased system reliability (fault tolerance) since, for example, the failure of or a fault in a single analog to digital or digital to analog conversion unit effects only one line switch termination node and not a plurality of these nodes as would be the case using shared channel banks. An example of a shared channel bank is the commercially used Bell System D2 Channel Bank.

As indicated above, in addition to analog information, digital data may also be concentrated into the T1 lines associated with the line switch. For example, line switch termination code 170-Q may be hooked up to a digital data set as opposed to being hooked to an analog subscriber station. The individual circuit in the line switch attached to this line switch termination node does not have (or need) analog to digital or digital to analog conversion units. The digital data of a proper format may be inserted directly onto a T1 line without any further processing. In this case the line switch would effectively serve as a concentrator (expander) with respect to data going between node 170-Q and one of the T1 lines associated with, in this case, line switch 130.

Figure 2:
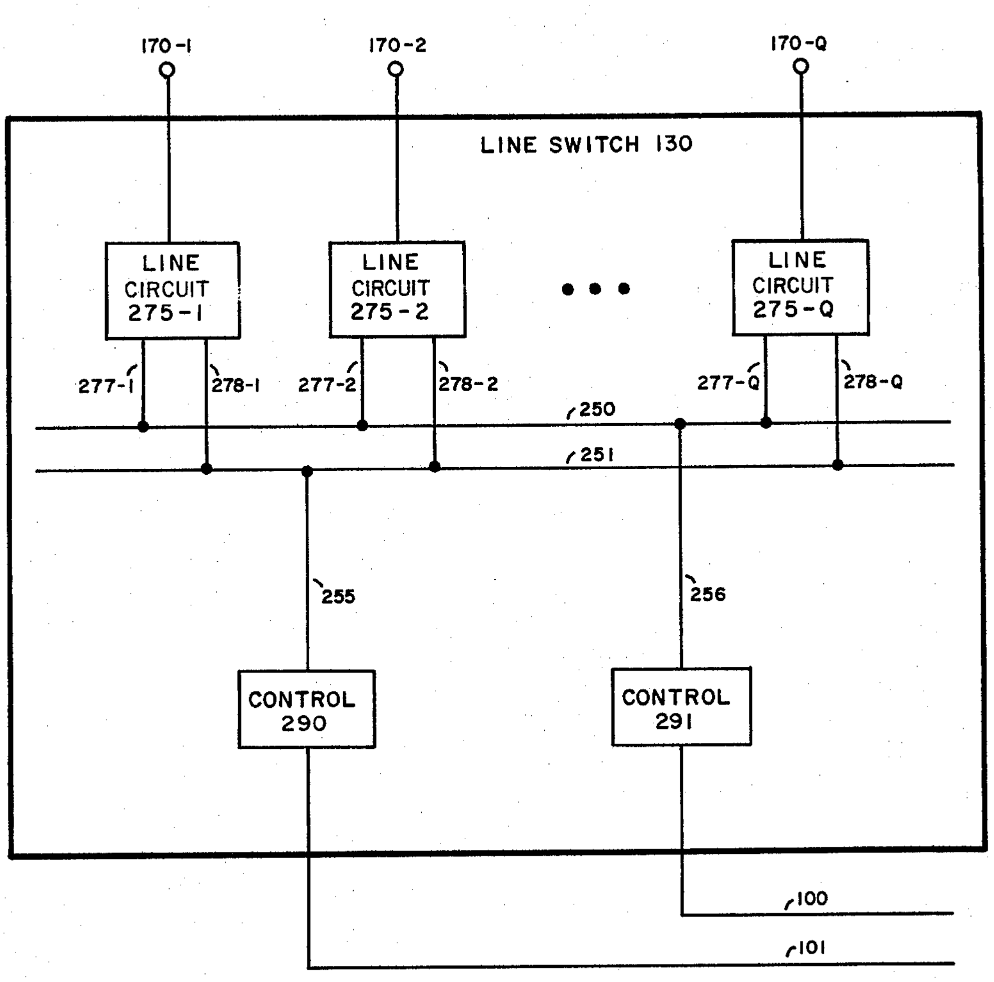
FIG. 2 depicts an example of line switch organization for the line switches of FIG. 1, suitable for use in accordance with the invention.

FIG. 2 shows a sample line switch organization which may be used in accordance with the system being set out herein. In particular, line switch termination nodes 170-1, . . . , 170-Q, of FIG. 2, are shown terminating at line circuits 275-1, . . . 275-Q. The line circuits to which analog information is input contain the analog to digital and digital to analog converters referred to above. All of the line circuits, including those line circuits to which digital data is input, seve to concentrate (expand) the input information onto either of two T1 lines, lines 100 and 101 as depicted in FIG. 2. This concentration (expansion) function is performed under the control of either control 290 or control 291. Control 290 and control 291 may be realized by a hardwired logic circuit for performing the well-known concentration or expansion function desired. For completeness, connectors 277-1 through 277-Q, 278-1 through 278-Q, 250, 251, 255, and 256 are shown in FIG. 2 interconnecting the line switch termination nodes, the line circuits, the control devices, and the T1 line pair associated with the depicted line switch.

In summary, line switches 130, 131, 133, 134, and 135, as shown in FIG. 1 and as shown in detail in FIG. 2, may be considered to be the remote part of subscriber loop multiplex system. Prior art SLM systems, such as the one cited, perform the line switch functions required herein, namely, concentration (expansion) and per line encoding. However, according to the preferred embodiment of this invention the PCM code produced must exhibit mu 255 characteristics. As indicated above, methods and apparatus for performing this type of per line analog to digital conversion (and conversely, per line digital to analog conversion) are set out in the applications incorporated above by reference.

It should be noted that since according to the invention each line switch is interconnected to the switching network via a completely independent pair of T1 lines, if one T1 line of the pair fails, peripherals attached to the line switch do not lose total access to the network.

For example, if T1 line 100 fails, peripherals interconnected to network 120 via line switches 130 and 131 would still have access to the network over T1 line 101. Hence, provision is made at the remote line switch level for two aspects of system reliability (fault tolerance). These aspects, as stated above, are (1) access by peripherals not being precluded by a single analog to digital or digital to analog converter failure and (2) access to the switching network not being precluded by a single T1 line failure.

Referring again to FIG. 1 it should be noted that in addition to lines 100 and 101 being T1 lines, line 102 is a T1 line which carries data multiplexed from analog trunks 171-1, . . . , 171-R onto line 102 via channel bank 132. An example of channel bank 132 which may be used in the preferred embodiment of the invention is the Bell System D3 channel bank. Assuming channel bank 132 is a D3 channel bank, R, is upperbounded by 24.

Still referring to FIG. 1, lines 106 and 107 are standard T1 lines carrying concentrated code, from line switch termination nodes 172-1 through 172-S, to and from network 120. Line switch 133 performs the concentration into T1 lines 106 and 107. Again, as far as reliability is concerned, it should be noted that if either of T1 lines 106 or 107 fails, data from nodes 172-1 through 172-S may still be concentrated onto the remaining one of T1 lines 106 and 107 thus providing a continued access path to switching network 120.

T1 line pair 108, 109 is shown interconnecting processor 141 of common control 140 to switching network 120 while T1 line pair 112 and 113 is shown interconnecting processor 151 of common control 150 to switching network 120. It should be noted that all of the individual portions of the common control, for example, processor 141, memory 142, and I/0 device 143, communicate with each other via switching network 120, and that, in addition, each of these units are independently interconnected to network 120. In particular, referring to FIG. 1, memory 142 and I/0 device 143 are interconnected to switching network 120 via line switch 134 over T1 lines 110 and 111. Memory 152 and I/0 device 153 of common control 150 are interconnected to switching network 120 via line switch 135 over T1 lines 114 and 115.

Note also that each I/0 device and each memory is shown connected to a line switch by a pair of wires. In particular, I/0 device 143 is shown connected to line switch 134 via wire 185-1 and wire 185-2, I/0 device 153 is shown connected to line switch 135 via wire 186-1 and wire 186-2, memory 142 is shown connected to line switch 135 via wire 185-L-1 and wire 185-L and memory 152 is shown connected to line switch 135 via wire 186-M-1 and wire 186-M. If a memory or I/0 device fails to gain access to the switching network through one of the pairs of wires connected between the peripheral and the line switch, the other wire in the pair will serve as a backup. In addition to double wire is used to allow the dual independent access of both processors to both memory and I/0 devices.

Both line switch 134 and line switch 135 may accommodate additional inputs. Additional line switch termination nodes emanating from each of line switch 134 and line switch 135 are indicated by three dots for each switch in FIG. 1.

The above recited independent connection of peripherals to the switching network provides for increased fault tolerance since if any one peripheral should fail or if any one interconnection path should fail, the remaining peripherals and interconnection paths remain operative.

In summary, the general system organization for a multiple fault tolerant network in accordance with the preferred embodiment of the invention is depicted in FIG. 1. Further aspects of system reliability will become evident with reference to the remaining figures and the following text. These figures and text set out in detail the structure and function of switching network 120.

Figure 3:
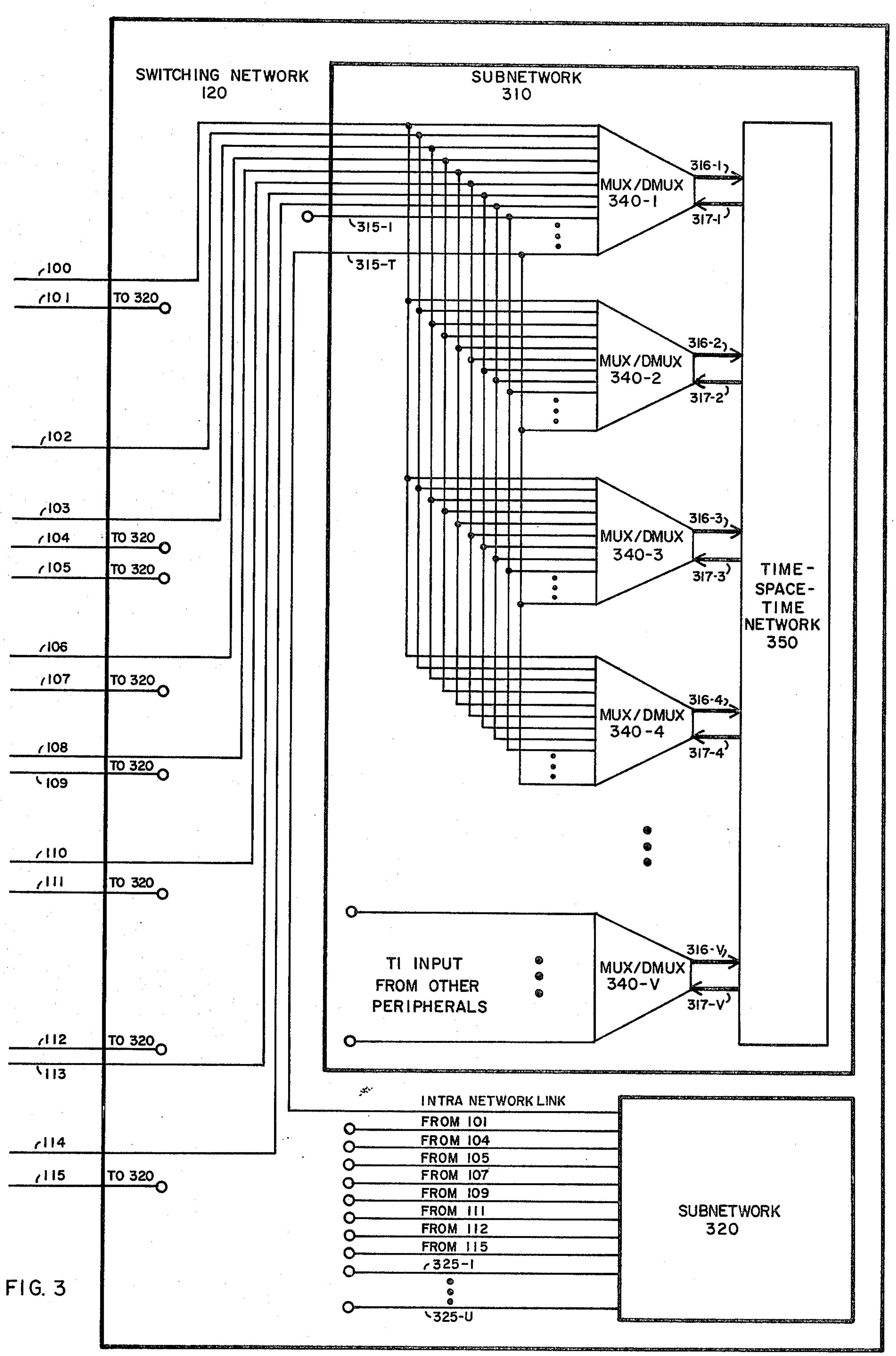
FIG. 3 depicts the details of one embodiment of the switching network shown in FIG. 1.

Referring to FIG. 3, the switching network is depicted as being comprised of a pair of subnetworks. These subnetworks are labeled as subnetwork 310 and subnetwork 320. Inputs to subnetwork 310 are shown as links 100, 102, 103, 106, 108, 110, 113, 114, 315-1, . . . , 315-T and "T1 input from other peripherals." How these inputs are handled in subnetwork 310 will be explained in detail below. Subnetwork 310 and subnetwork 320 are identical; therefore, only subnetwork 310 is displayed in detail in FIG. 3. However, the inputs from FIG. 1 to subnetwork 320 are displayed in FIG. 3 for completeness. These inputs are shown as coming from links 101, 104, 105, 107, 109, 111, 112, 115, and from additional possible input links 325-1 through 325-U.

Subnetwork 310 comprises multiplexing means including multiplexing/demultiplexing (MUX/DMUX) devices 340-1, 340-2, . . . , 340-V. Each of these devices serve to multiplex groups of T1 lines onto a superhighway and also serve to demultiplex signals appearing on a superhighway for transmission over T1 lines. Subnetwork 310 further comprises a time-space-time (TST) network, shown as time-space-time network 350 in FIG. 3. Network 350 serves as the interface between superhighways. Each subnetwork is independent from the other and under the primary control of one common control unit (comprising a processor, memory, and I/0 devices) and under the secondary (or backup) control of a second common control unit. For example, by observing FIG. 1 and FIG. 3 together, subnetwork 310 is shown and defined to be under the primary control of common control unit 140 and under the secondary control of common control unit 150. Similarly, subnetwork 320 is defined herein to be under the primary control of common control unit 150 and under the secondary control of common control unit 140. In particular, the primary control link from control processor 141 to subnetwork 310 may be observed as T1 line 108. The primary control link from control processor 151 to subnetwork 320 may be observed as T1 line 112. Links 109 and 113 are secondary control lines. These secondary control lines are means by which a control processor can (1) indirectly access a subnetwork under its primary control in the case where the primary link to that subnetwork fails and (2) directly access a subnetwork for secondary control.

Thus for example, secondary link 109 directly accesses subnetwork 320 and thereby enables control processor 141 to control subnetwork 320 directly if the primary control link to subnetwork 320 from processor 151 should fail or if processor 151 itself should fail. Also, processor 141 may indirectly access subnetwork 310 via link 109, subnetwork 320 and intra network link 315, in the event that primary control of subnetwork 310 via link 108 should fail. The indirect control of a subnetwork via intra network links will be explained in greater detail hereinafter.

Thus, another aspect of system reliability is provided, namely, that a fault occurring in a given subnetwork will not prevent the independent operation of the other subnetwork of a subnetwork pair. Note also that a fault in either of common control devices 140 or 150 will not effect the operation of the subnetwork being controlled by the non-faulty common control.

Referring again to FIG. 3, it may be seen that each MUX/DMUX serves as the interface between a plurality of digital links and what is depicted as a coaxial cable pair comprising a superhighway. For example, MUX/DMUX 340-1 is depicted in FIG. 3 as interconnecting links 100, 102, 103, 106, 108, 110, 113, 114, 315-1, . . . , 315-T, to the superhighway comprised of coaxial cables 316-1 and 317-1. It should be noted that common control processor 141, as stated above, is interconnected to MUX/DMUX 340-1 primarily via link 108 and that link 108 is treated as any other data link as far as multiplexing data onto a superhighway is concerned.

It should be noted that for increased system reliability, whenever a pair of T1 lines from a line switch is input to switching network 120, the pair is split up between the two subnetworks comprising the switching network. Thus, for example, T1 line 100 may be seen as interconnected to subnetwork 310 while T1 line 101 may be seen as interconnected to subnetwork 320. Hence, if one of the two subnetworks depicted in FIG. 3 fails, subscribers, etc., interconnected to the switching network via line switch 130 and T1 lines 100 and 101, will still have switching capability at their disposal. In particular, if subnetwork 310 failed subscribers at line switch 130 would have switching capability available at subnetwork 320 via T1 line 101.

It should also be noted that, as alluded to above, information may be routed between subnetworks. Intra network links between subnetworks are provided for such connections. In FIG. 3, line 315-T is labeled as an intra network link and interconnects subnetwork 320 with subnetwork 310. Line 315-T may be a standard T1 line. Intra network links provide still another aspect of system reliability since, for example, if common control processor 141, which primary controls subnetwork 310 via link 108 should fail, common control processor 151 could control subnetwork 310 via two available paths. These paths are, via secondary control link 113 directly, or, if this path is also inoperative, via subnetwork 320. In particular in the later case, common control processor 151 would have access to subnetwork 310 via intra network link 315-T.

Still further, every line switch has access to both subnetworks in a network not only by the splitting of the pair of T1 lines associated with each line switch between the subnetworks (explained above) but also via the intra network links. The first choice in establishing a connection will always be in one subnetwork. Only if all paths are busy will a second attempt be routed via the other subnetwork in a pair. This practically means that only overflow traffic will be routed between the subnetworks in a pair using the intra network links. The internal blocking in the subnetworks is almost zero and can be neglected so that the major source of blocking will be on the T1 lines towards the line switch or trunks. Assumingly a very low blocking probability in the subnetworks, the only significant blocking in the network is on these T1 lines. It is important to point out that due to the time division switching the cost of the network is relatively low so that one can more readily afford to provide the extra links between subnetworks needed for very low blocking probability at a reasonable cost.

According to the preferred embodiment of the invention up to forty T1 lines may be multiplexed onto four superhighways. Each MUX/DMUX must be capable of performing forty to one multiplexing and one to forty demultiplexing. Multiplexing and demultiplexing in and of itself is not new. The MUX/DMUX device itself does not constitute a part of the instant invention.

In FIG. 3, up to forty T1 lines are shown being multiplexed onto four superhighways by MUX/DMUX devices 340-1, 340-2, 340-3, and 340-4. The four superhighways are shown as comprised of coaxial cable pairs 316-1 and 317-1, 316-2 aand 317-2, 316-3 and 317-3, and 316-4 and 317-4. Each coaxial cable is unidirectional. The direction of data flow on each cable is indicated in FIG. 3 by an arrow head. These cables are the paths between the MUX/DMUX units and time-space-time network 350.

For increased system reliability, as well as even traffic distribution, it is much better if a group of T1 lines is multiplexed not over a single superhighway but over a group of superhighways. It will be noted that according to FIG. 3, T1 line 100 is multiplexed onto each of the four superhighways set out above. In a similar manner T1 lines 102, 103, 106, 108, 110, 113, 114, and lines 315-1 to 315-T (which make up the balance of the forty T1 lines being multiplexed by MUX/DMUX devices 340-1, 340-2, 340-3, and 340-4, onto the four superhighways associated with these MUX/DMUX devices are multiplexed in like manner.

Six fixed channels from each and every one of the forth T1 lines in the set under consideration are assigned to each of the four superhighways. According to the preferred embodiment of the invention a superhighway has the capability of carrying up to 256 channels of data. Only 240 channels of data from the forth T1 lines associated with each group of MUX/DMUX devices will be carried on each of the four superhighways (six channels from each T1 line times forty T1 lines). The remaining sixteen channels available on each superhighway may be used for expansion in the switch to, for example, decrease blocking or for control and signaling purposes.

It is important to note that if one superhighway from a group of four fails, all channels on that superhighway will be lost but such loss will only increase the blocking probability over the T1 lines serviced by the group of 4 MUX/DMUX devices. Not a single T1 line will be completely lost. For example, if the superhighway comprising line 316-1 and 317-1 should fail, traffic offered to a line switch, such as switch 130, will be forty-two channels instead of forty-eight channels. If traffic were calculated at, for example, 30 erlangs with 0.001% blocking, the offered traffic after the error might still be 30 erlangs but with a blocking probability of 1%. Hence, a fault comprising a loss of a whole MUX-/DMUX device or a superhighway would at most cause only a degradation of service and not a total loss of service to a given T1 line. Thus fault tolerance is provided at the T1 line, superhighway interface level.

Additional fault tolerance at the T1 line, superhighway interface level may be provided by adding spare MUX/DMUX devices to the configuration depicted in FIG. 3. In the event of a failure of a MUX/DMUX device, the spare MUX/DMUX would be enabled, thus, offering as much traffic handling capability to the outside world as was offered before the single MUX/DMUX failure. Hence with spare MUX/DMUX devices even degradation of services can be avoided.

FIG. 3 shows T1 input from other peripherals not shown in FIG. 1. The MUX/DMUX devices indicated by three dots after device 340-4, i.e., device 340-5 (not shown) through 340-V and superhighways comprised of cable pairs from 316-5 and 317-5 (not shown) through 316-V and 317-V, service these additional potential inputs to network 120.

By observing FIG. 3 it may be seen that all of the superhighways are interconnected to time-space-time network 350. The details of time-space-time network 350 which serves as the interface between superhighways, will be set out hereinafter.

Figure 4:
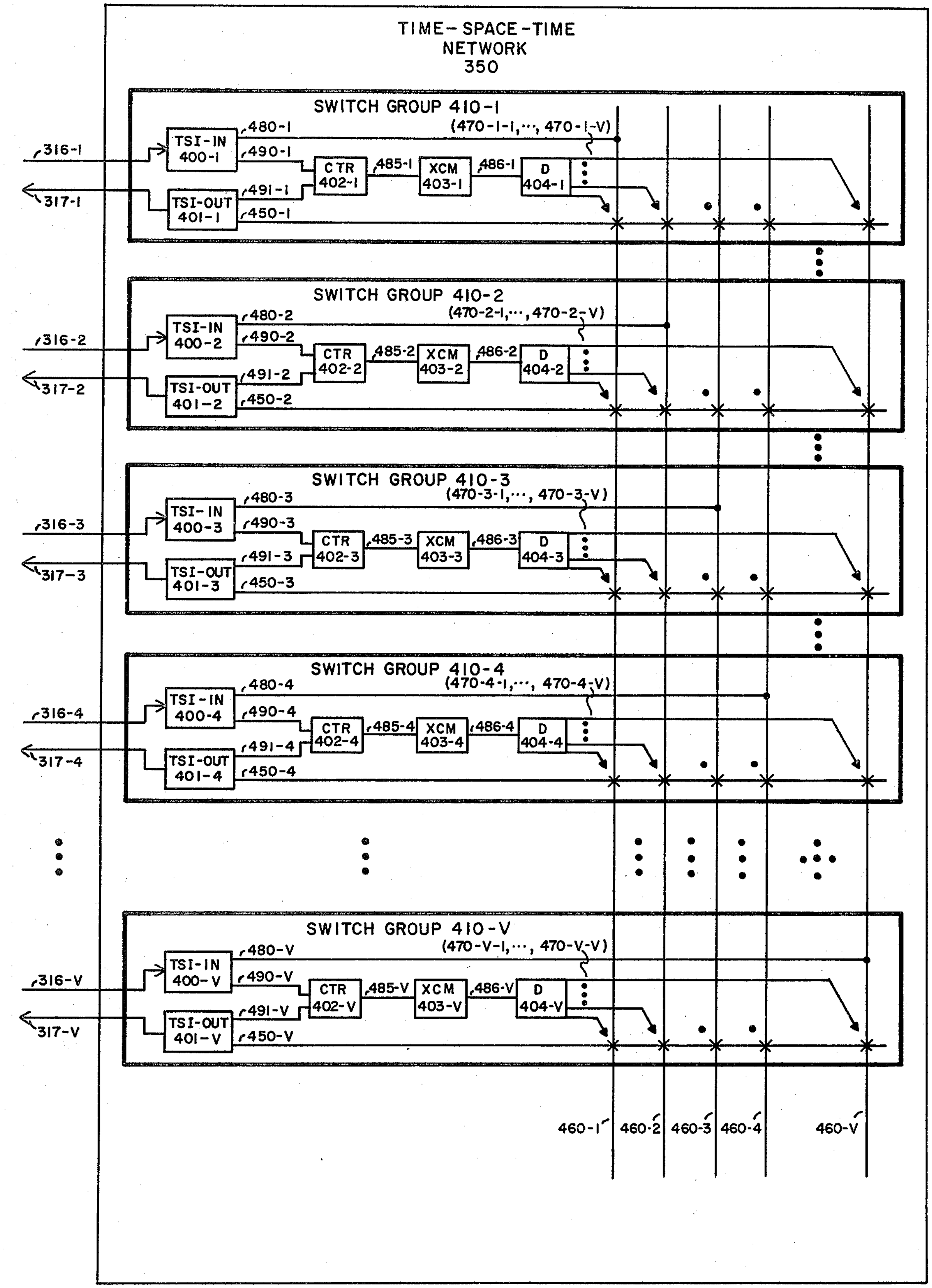
FIG. 4 depicts the details of one embodiment of the time-space-time network shown in FIG. 3.

Referring to both FIG. 3 and FIG. 4 (FIG. 4 to be explained in detail hereinafter) it should be noted that according to the invention every superhighway is to be completely independent of the other. According to the invention, each superhighway is controlled by a separate controller which performs all necessary functions for the superhighway including marker, call supervision, scanning, path search, emergency number service, and receiver/sender functions. Thus, according to the invention, the superhighway controllers perform a subset of the functions heretofore commonly performed by the common control processor as the North Electric Company NXIE processor, incorporated herein by reference, i.e., the control is now decentralized. This decentralized control is another aspect of system reliability since the failure of even the common control does not affect such vital superhighway functions as those listed above.

The decentralized control referred to above and to be explained in detail below, allows each superhighway to be absolutely independent, which in turn permits the switching matrix associated with the set of superhighways to be completely modular. The modularity may be observed with reference to FIG. 4.

In particular, time-space-time network 350, as shown in FIG. 4, is comprised of a set of groups of equipment. Each group of equipment is associated with a given superhighway. Thus, for example, the group of equipment designated as switch group 410-1 in FIG. 4 is shown associated with the superhighway comprised of the coaxial cable pair 316-1 and 317-1. The modular switch group concept results in a design which has no common part in the switching matrix serving more than one superhighway.

As stated above, in the summary of the invention, a superhighway, together with its controller, row of crosspoints associated with the controller, input time slot interchanger, output time slot interchanger, crosspoint control memory, and crosspoint address decoder, is designated herein as a switch group.

In particular, referring again to FIG. 4, switch group 410-1, for example, may be seen to comprise a superhighway, said superhighway being further comprised of cables 316-1 and 317-1, an input time slot interchanger designated as TSI IN 400-1, an output time slot interchanger designated as TSI OUT 401-1, a superhighway controller designated as CTR 402-1, a crosspoint control memory designated as XCM 403-1, and a crosspoint address decoder designated as D 404-1. In addition, FIG. 4 shows TSI In 400-1 interconnected to CTR 402-1 via link 490-1, TSI OUT 401-1 interconnected to CTR 402-1 via link 491-1, CTR 402-1 interconnected to XCM 403-1 via link 485-1 and XCM 403-1 interconnected to D 404-1 via link 486-1.

V switch groups, identical in structure to switch group 410-1, are depicted in FIG. 4.

The row of crosspoints associated with each switch group is shown lying in the horizontal plane of FIG. 4. Thus, each horizontal set of crosspoints depicted in FIG. 4 constitute a row of the space switching matrix portion of TST network 350. In effect, line 450-1 corresponds to row 1 of the switching matrix, line 450-2 corresponds to row 2, etc. The vertical lines running through each crosspoint represent columns of the switching matrix, each column being associated with and receiving input uniquely from a given switch group. Thus, for example, vertical line 460-1 is column 1 of the matrix and is associated with switch group 410-1, being interconnected to that switch group by link 480-1. Line 460-2, is column 2 of the switching matrix and is associated with switch group 410-2, being interconnected directly to that switch group via link 480-2. Similarly lines 460-3 through 460-V comprise columns 3 through V of the switching matrix portion of TST network 350.

Since the TST network shown in FIG. 4 is modular, a fault in any switch group does not directly affect the operation of any other switch group. Thus, in case of a fault, a switch group may be removed and replaced without affecting the operation of the TST network. This feature allows for simplified TST network maintenance and increased overall system reliability.

Details of the TST network structure and function will now be presented.

At the outset it should be understood that the components used to perform the actual TST switching are not in and of themselves new and that the concept of TST switching in and of itself is similarly not new. Conceptually, signals are first switched in time by an output time slot interchanger attached to an input superhighway, then these signals are further switched in space in a switching matrix and finally the signals are switched once again in time by an output time slot interchanger attached to an output superhighway.

Both the actual components for performing the TST switching and the concept of TST switching itself constitutes no part of the instant invention. In particuar, Demousseau in an article entitled "A Local Area Integrated PCM Telephone Network", appearing in the March, 1964 IEEE Transactions on Communications and Electronics shows switching stages between PCM highways which correspond to the switch group organization depicted in FIG. 4, except that, according to the instant invention, decentralized control is taught as being desirable to increase system fault tolerance. Decentralized control is put into effect in the instant invention by locating controllers in each switch group as shown in FIG. 4. This is not shown by Dumousseau.

Thus, although TSI In 400-1, TSI OUT 401-1, XCM 403-1, and D 404-1, or their analogs, may be seen in combination with these devices in a modular switch group arrangement to provide decentralized control is a feature of the instant invention not shown in the prior art. It should also be noted that the way in which a processor communicates with a CTR in any one of a plurality of available channels is new. Processor/CTR communications will be discussed in detail hereafter following the completion of the discussion of the TST network structure and function.

Figure 5:
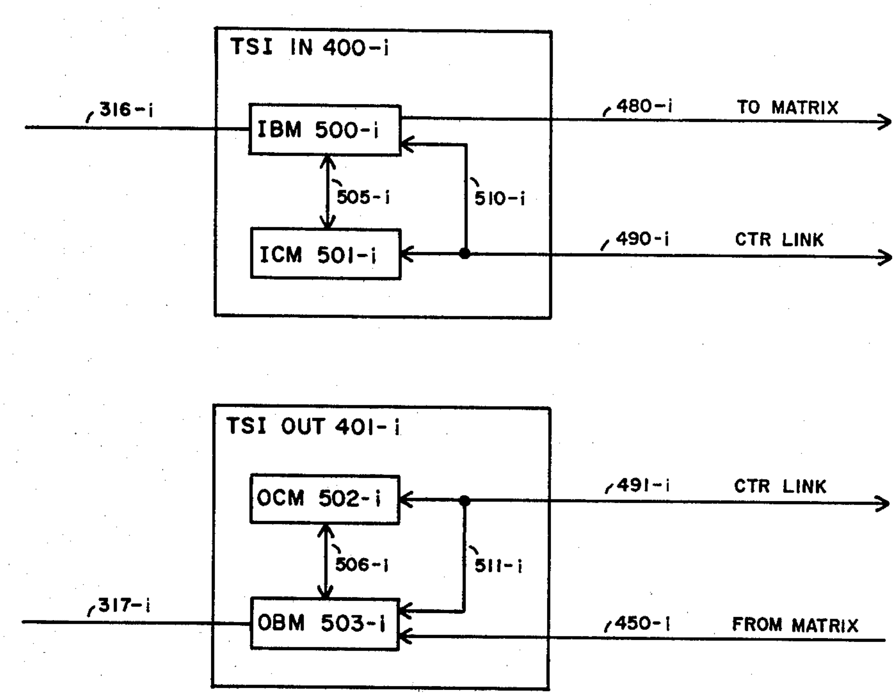
FIG. 5 depicts the details of the input and output time slot interchangers shown in FIG. 4.

Although TST switching is not in and of itself new, the method of performing this switching with the apparatus depicted in FIGS. 4 and 5 under a decentralized control will now be set out in detail to help further an understanding of how TST switching may be performed according to the preferred embodiment of the invention being set out herein.

For the sake of example, suppose that data appearing on the input superhighway to switch group 410-1 is destined for the superhighway associated with switch group 410-V. Thus, data appearing in a given one of 256 channels on link 316-1, is to be switched to a given one of 256 channels by link 317-V. Still further, for the sake of illustration, assume that data is input on link 316-1 during channel X. Assume also that the data is to be output on link 317-V during channel Y. Thus, TST network 350 must function to, (1) receive data from 316-1 during channel X, (2) find a channel during which both links 480-1 and 450-V are idle so that a connection may be made between TST IN 400-1 receiving the data from link 316-1 in channel X and TSI OUT 401-V which is to transmit the data onto link 317-V in channel Y, and (3) to transmit the data so switched onto link 317-V in channel Y.

Before explaining the details of how the time-space-time switching may be performed, attention is called to FIG. 5. FIG. 5 shows sample TSI IN 400-*i* as being comprised of an Input Buffer Memory, IBM 500-*i*, and an Input Control Memory, ICM 501-*i*. Sample TSI OUT 401-*i*, is shown in FIG. 5, and comprises an Output Buffer Memory, OBM 503-*i* and an Output Control Memory, OCM 502-*i*. IBM 500-*i*, ICM 501-*i*, OCM 502-*i* and OBM 503-*i* may be realized by randon access memories (RAMs) and constitute no part of the instant invention. The operation of the TSI's and in particular of the RAM's will be explained below in the context of explaining the overall TST network operation.

TSI IN 400-*i* and TSI OUT 401-*i* as depicted in FIG. 5 are identical to TSI IN 400-1 and TSI OUT 401-V located in switch groups 410-1 and 410-V, respectively. Therefore, all further reference made to FIG. 5 in indicating the operation of TSI IN 400-1 and TSI OUT 401-V will refer to components with the variable *i* being set to 1 for TSI IN 400-1 and with the variable *i* being set to V for TST OUT 401-V.

Concentrating on TSI IN 400-1 it will be seen that cable 316-1 is interconnected with an input buffer memory designated as IBM 500-1. Signals appearing in channel X on link 316-1 are stored in location X of IBM 500-1.

The input control memory, designed as ICM 501-1 in FIG. 5 perform a time translation on the data stored in IBM 500-1. In particular, the contents of the jth location in ICM 501-1 indicates which channel of data stored in IBM 500-1 is to be transmitted through the space portion of TST network 350 during channel *j*. Thus, for example, if the address of the location in IBM 500-1, containing the data input to IBM 500-1 during channel X, is contained in the jth location of ICM 501-1, data incoming to TSI 400-1 during channel X will be output to the matrix on link 480-1 during channel *j*. It should be noted that according to FIG. 5 ICM 501-1 is interconnected directly to CTR 402-1 via link 490-1.

The controller associated with the input switch group together with the controller associated with the output switch group, work in conjunction through the common control processor to determine an idle path through TST network 350. An idle path is defined as a channel during which, for the instant example, both links 460-1 and 450-V are available to simultaneously effect a connection between TSI IN 400-1 and TSI OUT 401-V.

An idle path search may be performed by the common control processor by merely checking a busy/idle status table which the processor could update and maintain for each row and column of the switching matrix. Idle path search methods are not considered to be a part of the instant invention.

Supposing that channel *j* is found to be an idle path through TST network 350 between the column 460-1 and row 450-V, both of said controllers (CTR 402-1 and CTR 402-V) having communicated with each other via a common control processor. (The way in which such communication may be established is described later herein). CTR 402-1 will then via link 490-1 write into ICM 501-1, in the jth location, the address of the Xth location of IBM 500-1. CTR 402-V will write into OCM 502-V of TSI OUT 401-V via line 491-V, at the Yth location of OCM 502-V of TSI OUT 401-V, the address of the jth location of OBM 503-*i*. The data in OBM 503-V of TSI OUT 401-V at location *j* will then be transmitted on cable 317-V during channel Y.

It should be noted that only one crosspoint in the space matrix needs to be closed to complete the path between TSI IN 400-1 and TSI OUT 401-V, this crosspoint being located at the juncture of links 460-1 and link 450-V. CTR 402-V will, for the instant example, write the address of the crosspoint which interconnects links 460-1 and link 450-V into location *j* of XCM 403-V. XCM 403-V, under the control of XTR 402-V, will pass to decoder 404-V the address of the crosspoint at the juncture of the indicated links during channel *j*. Thus, the crosspoint at the jucture of links 460-1 and 450-V will be closed during channel *j* completing a path between TSI IN 400-1 and TSI OUT 401-V during the indicated channel.

The above description shows how a path from cable 316-1 to cable 317-V may be established. This path will carry signals only in a single direction from a first peripheral connected to the matrix by cable 316-1, to a second peripheral connected to the matrix via cable 316-V. Signals traveling from said said peripheral to said first peripheral, for example, signals comprising part of a bidirectional telephone call, require a path to be found in the matrix from cable 316-V to cable 317-1, for the first and second peripheral of the instant example. This second path is found at exactly the same way as the path was found between cable 316-1 and cable 317-V. However, the path search for the cable 316-V to cable 317-1 connected is found completely independent of the path search for the connection of cables 316-1 and 317-V.

Thus, it has been shown by a specific example that data coming into any TSI IN may be switched both in time and in space to and through any desired TSI OUT.

Although, as indicated above, the concept of decentralized control is not new, the method of implementing decentralized control in the system being set out herein is believed to be novel and will now be described in detail.

It should be noted that prior art switching systems which operate with decentralized control will effect communications between the main processor and a decentralized controller via control buses which are separate and distinct from nominal switching paths. According to the invention being set out herein, no separate control paths are required for CTR/processor communications. Only nominal data paths are used for the control function. As a result, there are very many potential control paths between the processor and the CTR's which may be used to effect control. Thus, another aspect of system reliability is provided in that a plurality of potential control paths is constantly available to effect CTR/processor communications.

According to the principles of the preferred embodiment of the instant invention, the common control processor such as processor 141 of FIG. 1, performs only a subset of the functions performed in the prior art common controlled systems such as the North Electric Company NX1E system. In particular, the common control processor according to the preferred embodiment, is responsible only for calls in a transient state, for translation, maintenance, administration, and toll ticketing. The superhighway controllers, such as CTR 402-1 depicted in FIG. 4, serve as a buffer between the outside world and the common control processor. The superhighway controller is responsible for all phases of call set-up and is intended to relieve the common control processor of simple, but time consuming tasks such as marker, call supervision, etc., (listed above).

In order for the superhighway controllers to function, they must, however, be able to communicate with the common control processor assigned to control the subnetwork in which the superhighway controllers reside. This communication between the superhighway controllers and a common control processor may be performed in the following manner according to one embodiment of the invention.

As may be seen with reference to FIG. 1, the common control processors access network 120 over standard T1 lines. As an example, processor 141 of common control 140 accesses switching network 120 over T1 link 108. The data appearing on T1 link 108 is input to and received from subnetwork 310 along with data from other T1 links. This may be seen with reference to FIG. 3.

The data appearing on link 108, which in fact is coming from (or going to) processor 141, is multiplexed (demultiplexed) over devices 340-1, 340-2, 340-3, and 340-4 to (from) TSI network 350. Thus, referring to FIG. 4, data from processor 141 may find its way into any one of four time slot interchange devices, namely, TSI IN 400-1, TSI IN 400-2, TSI IN 400-3, or TSI IN 400-4 for the example chosen.

Referring now to FIG. 5 which displays an embodiment of time slot interchanger TSI IN **400-*i*, and an embodiment of time slot interchanger, TSI OUT 401-*i*, it should be observed that processor data will upon being input to a TSI IN be stored in an input buffer memory, like IBM 500-*i*, after being multiplexed onto a superhighway cable like 316-*i*, as explained earlier such an input buffer memory is contained in each and every TSI In and may comprise a random access memory. Recall that data appearing in channel X of a superhighway is stored in location X of the IBM associated with the input superhighway. Thus, for example, processor data appearing in channel X over cable 316-*i* is stored in location X of IBM 500-*i***.

Each CTR in network 350 operates in two modes to, first, set up CTR/processor communications, and then, secondly, maintain the set-up communication path with the processor. The first mode will hereinafter be referred to as "search" mode and the second mode will hereinafter be referred to as "operation" mode. Both of these modes of CTR operation will now be described in detail.

During search mode, which exists at the outset of setting up CTR/processor communications, each superhighway controller, in TST network 350 searches both the input buffer memory and output buffer memory associated with the switch group in which the CTR is located, for the channel in which processor information is to appear. The search of the output buffer memory is explained in detail later. The search of the input buffer memory is performed as follows.

Initially, the processor sends a synchronization code word toward the TST network during an arbitrary but fixed channel. Each controller for a superhighway searches its TSI IN input buffer memory for the synchronization code to determine the channel in which the processor data is to be sent. The location of the control word in an input buffer memory will, as explained above, uniquely identify the channel in which processor data is sent. Recall, data coming into an input buffer memory during channel *j* is stored in location *j* of the input buffer memory. Assume, for the sake of illustration, that the synchronization code finds its way to TSI IN 400-1 of FIG. 4 in such a manner as described above. Assume further, again for the sake of illustration, that the synchronization code is stored in location X of IBM 500-1 of FIG. 5. (*i* of IBM **500-*i* in FIG. 5 may be assumed to be set equal to 1 for the sake of illustration since the input synchronization code is sent to TSI IN 400-1** by assumption).

Once the channel in which the synchronization code is being sent has been determined, channel X for the illustrative example, the CTR for the switch group which found the synchronization code, CTR 402-1 in the instant example, will proceed to "lock-on" the channel in which the synchronization code appears. The channel in which the synchronization code appears will hereinafter be referred to as the processor control channel. In order for the controller to lock on the processor control channel an arbitrary, but predetermined, number of time division multiplex frames must pass during which the synchronization code is picked up during each passing frame by the controller trying to lock on the processor channel. Once the predetermined number of frames pass, the controller will be assured that it has actually found the synchronization code and that it is not trying to lock on a non control channel.

Upon locking on the processor control channel, the CTR which found the control channel becomes designated the "master CTR" for that channel. Thus, according to the illustrative example, CTR 402-1 will be designated the master CTR. All other CTR's in the TST network will be referred to as "slaves" as far as that particular channel is concerned.

At the outset the master CTR must perform two functions while in the search mode. These functions are (1) informing the processor that the synchronization code has been found and that processor information may now be injected by the processor into the switching network and (2) inform all slave CTR's which CTR is the master and that the processor control channel has, in effect, been found. Furthermore, the indication to the slave CTRs that the master CTR has been found, is a signal to the slave CTRs that operation mode is to be entered into.

The method which is used by the master CTR to inform the processor that it has locked on the processor control channel is to send back to the processor the synchronization code during the control channel. Thus, master CTR 402-1, for the instant example, must send back to processor 141 the synchronization code during channel X. TSI OUT 401-1 and cable 317-1 are utilized to perform this function in conjunction with CTR 402-1. CTR 402-1 places the synchronization code in its output buffer memory, OBM 503-1, at location 256 for example. The address of channel number 256 from OBM 503-1 is then written into channel X of OCM 502-1 by CTR 402-1. Thus, the synchronization code will be sent back to the processor during channel X via a cable 317-1.

Upon being informed that the master CTR has found the synchronization code, the processor may proceed to address and send packets of information to the switching matrix. A processor packet of information comprises n channels worth of data. The n channels are sent to the switching matrix one chaannel at a time during each of n time frames during the predetermined processor control channel. The address sent by the processor indicates which CTR in the TST network is to receive the packet of information from the processor. Thus, for example, in the preferred embodiment of the invention, n is set equal to 8. During the control channel of frame 1 according to the preferred embodiment, the synchronization code is sent to the matrix. The control channel during frame 2 will contain the address of the controller to which the data is to be routed, and the control channels of frames 3 through 8 will actually contain the processor information destined for the addressed CTR (during channel X of each frame according to the example).

According to the preferred embodiment of the invention, once the processor control channel is determined the master CTR will route the synchronization code and all subsequent information appearing from the processor during the control channel and send the code and information into the switching matrix during one of the spare channels referring to above (channels 241 through 256 for the instant example). Thus, during channel 256 for example, following the lock onto the synchronization code, the master CTR outputs the synchronization code onto the unique column in the switching matrix associated the master CTR. The manner in which this translation from channel X to channel 256 takes place is that CTR 402-1, the master controller in the instant example, writes X, the address of the processor control information stored in IBM 500-1, into location 256 of ICM 501-1. Thus, during channel 256 of each succeeding frame, information received from the processor by TSI IN 400-1 during channel X is output to the switching matrix during channel 256.

Still further, according to the preferred embodiment, the slave CTR's (not knowing that they are the slave CTR's yet) have, like the master CTR, searched their respective IBM's for the synchronization code for some predetermined time. However, the slave CTR's do not find the synchronization code. After the predetermined search period is exhausted each of the slave CTR's look to the matrix during channel 256 to see the synchronization code. This determination is made by observing which column (recall each column is associated uniquely with a given CTR) carries the synchronization code during channel 256. Each CTR does this by closing, during a first time frame, a first crosspoint in the row of crosspoints uniquely associated with each controller and, closing during a second time frame, a second crosspoint in the row of crosspoints uniquely associated with each controller, etc. Thus, for example, CTR 402-4 in the instant example will first close the crosspoint at the juncture of link 460-1 and 450-4, then, during the next frame close the corsspoint at the juncture of links 460-2 and 450-4 etc., until the synchronization code appears on link 450-4 and thus appears in OBM 503-4.

In summary, according to the instant example, CTR 402-1 will output the synchronization code into link 460-1 via link 480-1 during channel 256. CTR 402-4 will observe the synchronization code on link 450-4 after the first crosspoint recited above, i.e., the crosspoint at the juncture of links 460-1 and 450-4 (the crosspoint associated with column 1) is closed. The closing of this crosspoint causes the synchronization code to be placed in location 256 of OBM 503-4. Location 256 of OBM 503-4 is examined by CTR402-4 which is searching for the synchronization code. Once the code is found, the CTR knows the address of the last crosspoint closed, in this case the crosspoint associated with column 1. Thus, CTR 402-4 will determine that column 1 carried the synchronization code and that, therefore, CTR 402-1 is the master CTR.

All the CTR's now enter operation mode.

It should be noted that upon entering operation mode, all of the CTR's lock onto the column uniquely associated with the master CTR during the channel in which the synchronization code was detected (channel 256 according to the illustrative example). Thus, again for the instant example, all crosspoints in the column uniquely associated with master CTR 402-1, i.e. all crosspoints through which link 460-1 passes, will be closed during channel 256.

As indicated above, once the processor is informed that the master CTR has locked onto the synchronization code, the processor will begin injecting information packets in the processor control channel. The processor information may be destined for any CTR, master or slave.

Recall that in the operation mode all of the CTR's close the crosspoint that connects each of them with information flowing from the processor during channel 256. Thus, all of the CTR's will receive the control channel including the address of the CTR that is to receive and act upon the processor signals to be sent during the 3rd through 8th frames of the time period during which a processor information packet is set. Only the addressed and the master CTR's will recognize the address "broadcasted" by the processor. Only the addressed CTR will proceed to act upon the processor signals sent during frames 3 through 8. It should be observed that the processor information sent during channel X will find its way into location 256 of the OBM associated with the addressed CTR.

In summary, what has been described above allows the processor to communicate with any CTR. The reverse direction of communications, mainly from any CTR to the processor, will now be discussed.

Each CTR may communicate with the processor over the control channel but only one at a time (i.e., no "broadcasting" in this direction).

Remaining within the framework of the illustrative example, it will now be shown how addressed CTR, 402-4, may communicte with the processor.

Information from addressed CTR 402-4 is placed by the addressed CTR into its input buffer memory. Thus, CTR 402-4 will place information destined for the processor into some location in IBM 500-4. The address of the location at which the information destined for the processor has been placed in the addressed CTR's input buffer memory is placed in one of the locations in the addressed CTR's input control memory. Thus, according to the illustrative example, location 256 of ICM 501-4 will contain the address of the location in IBM 500-4 which contains data that is destined for the processor.

Under the control of ICM 501-4, the information destined for the processor will be output from IBM 500-4 into the matrix during channel 256.

The master CTR which is monitoring the control channel at the time, will write into its crosspoint control memory, XCM, at location 256, the address of the crosspoint to be closed during channel 256. The crosspoint to be closed is located at the juncture of the column uniquely associated with the addressed CTR and the row associated with the master CTR. Thus, according to the illustrative example, CTR-402-1 will write into location 256 of XCM 403-1 the address of the crosspoint located at the juncture of links 460-4 and 450-1. Hence, during channel 256, the information destined for the processor will be routed to location 256 of OBM 503-1 (the OBM associated with the master CTR). The information destined for the processor will be stored in location 256 of OBM 503-1.

The master CTR routes automatically the information located in location 256 of its OBM towards the processor during channel X by having set the address of location 256 of its own OBM into the Xth location of the OCM associated with the master CTR. Thus, according to the illustrative example, CTR 402-1 will write the address of location 256 in OBM 503-1 into location X of OCM 502-1.

Thus communications between any CTR and the processor may be completed in either direction.

It should be noted that the above described method of communications between a processor and a set of CTR's is merely illustrative of one way in which decentralized control may be implemented. Variations on the method of communication set out above may be devised by those skilled in the art.

It should be noted that this decentralized control will allow for emergency service provision in the event of complete common control failure. Specifically, in the case of a total common control failure, the network will not be completely shut down. In this case, the network will simply run in an "emergency mode." Under this mode all calls directed toward a few selected "emergency numbers" could be normally completed. All other calls will reach a busy signal or recorded messages. This important feature is made possible due to the fact that the network controllers, CTR's, effect decentralized control referred to above, and are capable of performing basic telephone functions. The CTR's are not, of course, capable of providing translations and exotic features, but a small translation table, for example for sixteen local emergency numbers, could be easily stored in the CTR's and used in the emergency mode. It should be further noted that emergency mode of operation can be extended without additional cost to include all outgoing and all incoming calls as well. Incoming calls among offices could be terminated to any of the emergency numbers. All outgoing non-toll ticketed calls towards other offices could be outpulsed also.

Emergency service is particularly important for small remote offices which do not have their own common control. Offices with duplicated common control, such as the office depicted in FIG. 1, have a small probability of having to rely on emergency service since the probability of both common controls failing at the same time is very low. However, offices which do not have their own common control, i.e., those offices which are under the control of a remotely located common control and which are tied to that control via T1 lines, run a higher probability of having to rely on emergency service provisions. This is the case because, for example, the T1 lines interconnecting the remote office to its common control may be cut or in some other way become inoperative with no back-up common control being able to access the remote office. Thus, where the impact of emergency service may be minimal for the larger offices of the type depicted in FIG. 1, emergency service, as indicated above, is particularly important for the small remote office.

Hence, the CTR which serves as the interface between the outside world and the common control processor may provide rudimentary service in a case of common control failure which will enable subscribers to reach such numbers as police, fire, ambulence, etc., at any time, even in the face of total breakdown of the interface with a common control.

It whould be noted that in cases of processor failure since two processors are connected to the two subnetworks of a network pair and the subnetworks are interconnected via intra network links, a fault at the processor level is not fatal. As stated above, in this case, either processor can take over the control of the two subnetworks. In addition, according to the invention, the remote common control processor can control the local subnetwork pair via a standard T1 line interface in case both of the processors typically associated with the subnetwork pair are unavailable or inoperative.

As a final note, it should be understood that the overall system modularity enables a multinetwork configuration to be constructed if traffic considerations required greater switching capability. The links between the subnetworks of different network pairs are designated as inter network links. According to the preferred embodiment of the invention, the inter network links, like all other links, into a network, are T1 lines. Thus, each network in a multinetwork configuration would appear as a peripheral to every other network in the configuration.

What has been particularly disclosed by the illustrative example, constitutes a multiple fault tolerant communications system for digitally switching PCM data among time division multiplex lines.

It should be noted that the invention described herein has been illustrated with reference to a particular embodiment. It is to be understood that many details used to facilitate the descriptions of such a particular embodiment are chosen for convenience only and without limitations on the scope of the invention. Many other embodiments may be devised by those skilled in the art without departing from the scope and spirit of the invention. Accordingly, the invention is intended to be limited only by the scope and spirit of the appended claims.

What is claimed is:

1. In a ditial switching arrangement for an automatic telephone system, a plurality of lines, a plurality of line switch means, each of which line switch means includes input means connected to a different one of said lines, and each of which line switch means is operative to concentrate signals input from its lines for use in the system, at least one switching network comprised of at least a first and second subnetwork, at least a first time division link connecting the signal output of each of a plurality of said line switch means to said first subnetwork, and a second time division link connecting the signal output of the same plurality of line switch means to said second network, a plurality of highways, a plurality of multiplexer means in each of said subnetworks for selectively connecting said first and second time division links to said highways, and time-space-time switching network means comprising a plurality of switch groups for each of said subnetworks, different ones of said switch groups for a subnetwork having a different one of said highways which is connected to a different one of said multiplexer means for establishing connections between its associated highways.

2. A digital switching arrangement as set forth in claim 1 in which each of said line switch means is also operative to expand signals input to said line switch means by said links from the system.

3. A digital switching arrangement as set forth in claim 2 in which at least certain of said line switch means includes per line A/D conversion means and D/A conversion means.

4. A digital switching arrangement as set forth in claim 1 in which each of said means for connecting said links to said highways comprises a plurality of multiplexing means, and which includes at least one intra network link connected between each of a plurality of multiplexing means in one of said subnetworks and each of a plurality of said multiplexing means in the other of said subnetworks, whereby overflow traffic which occurs in said subnetwork can be processed by said multiplexing means in said other subnetwork.

5. In a digital switching arrangement as set forth in claim 1 in which said time-space-time switching network includes a plurality of switch groups, each of which switch groups is connected to a different one of said highways, and each switch group has a plurality of switch means including means for controlling the selective operation of said switch means, and means interconnecting the switch means in said switch groups.

6. In a digital switching arrangement for an automatic telephone system, the improvement comprising a plurality of lines, a switching network which includes a first plurality and a second plurality of multiplexing means, a plurality of superhighways, each of which is connected to a different one of said multiplexing means, line switch means for said lines, at least one time division link comprising T1 lines for connecting the outputs of said line switch means to an input for each of a plurality of said multiplexing means, and a second time division link comprising T1 lines for connecting the signal output of the same line switch means to said second plurality of multiplexing means, and time space time network including a plurality of modular switch groups, each of which switch groups incudes a different one of said superhighways, and means in each switch group for selectively effecting connection to the other ones of said switch groups.

7. A system as set forth in claim 6 in which each of said time division links has a plurality of channel groups, and each of said multiplexing means connected to said time division links is operative to process a different one of said channel groups on said time division links to the one of said highways which is connected thereto.

8. A digital switching arrangement as set forth in claim 6 in which each of said line switch means comprises a discrete line circuit for each of said lines, each of which line circuits has a first and second output, each line switch means including control means for connecting said first and second outputs for each line circuit to said first and second time division lines respectively, whereby each line is provided access to at least one of said subnetworks in the event of failure of one of said time division links.

9. A digital switching arrangement as set forth in claim 6 which includes further peripheral equipment, and digital links only for connecting said peripheral equipment to said multiplexing means.

10. A digital system as set forth in claim 6 which includes a channel bank for converting analog signals to digital signals, means for connecting analog incoming trunks to said channel bank, and at least one digital link connecting the output of said channel bank to at least one input of each of said plurality of multiplexing means.

11. In a digital switching arrangement for an automatic telephone system, a plurality of lines, line switch means connected to said lines, a switching network including at least a first and a second subnetwork, each of which subnetworks includes multiplexing means, each multiplexing means including a plurality of multiplexer-demultiplexer circuits, a plurality of highways, each of which highways is connected to a different one of said multiplexer-demultiplexer circuit, a first time division link connected between said line switches and each of said plurality of multiplexer-demultiplexer circuits in said first subnetwork, a second time division link connected between said line switches and each of said plurality of multiplexer-demultiplexer circuits in said second subnetwork, each of said time division links having a plurality of groups of channels, and each of said multiplexer-demultiplexer circuits being operative to process a different one of said groups of channels on its associated time division link to its interconnected highway.

12. A system as set forth in claim 11 in which said first and second time division links each has twenty-four channels, and in which said plurality of multiplexing means in each of said subnetworks comprises four discrete multiplexer-demultiplexer circuits, said four circuits being associated with forty time division links and in which each group of channels on each time division link comprises six channels.

13. A digital switching arrangement as set forth in claim 11 which includes a common control means, and in which at least one of the time slots on each of said highways is used to transmit control signals from a common control means.

14. In a digital switching arrangement for an automatic telephone system, a plurality of lines, a plurality of line switch means, each of which line switch means includes input means connected to a different one of said lines, and each of which line switch means is operative to concentrate signals from its lines for use in the system, at least one switching network comprised of at least a first and second subnetwork, at least a first time division link connecting the signal output of each of a plurality of said line switch means to said first subnetwork, and a second time division link connecting the signal output of the same plurality of line switch means to said second subnetwork, and at least one intra network link connected between said first and second subnetwork for use in routing the overflow traffic of one of said subnetworks to the other of said subnetworks.

15. A digital switching arrangement as set forth in claim 14 in which each of said line switch means is also operative to expand signals input to said line switch by digital links from the system.

16. A digital switching arrangement as set forth in claim 15 in which certain of said line switch means include A/D conversion means and D/A conversion means.

17. In a digital switching arrangement for an automatic telephone system, a plurality of lines, a switching network which includes a first plurality of multiplexing means, a plurality of highways, each of which is connected to a different one of said multiplexing means, line switch means for said lines, at least one time division link for connecting said line switch means to each of a plurality of said multiplexing means, said time division link having a plurality of channel groups, each of said multiplexing means connected to said time division link being operative to process a different group of said channels on said time division link to the one of said highways which is connected thereto, a time space time network including a plurality of switch groups, a plurality of circuit paths, each of which is common to said plurality of switch groups, each switch group having a first path connected to one of said common circuit paths, said first path for the different ones of the switch groups being connected to a correspondingly different one of said common circuit paths, a second path in each switch group, a group of switch means in each switch group, each of which switch means of a group is operative to connect said second path for its switch group to a correspondingly different one of said common circuit paths, and controller means in each switch group for selectively closing the different switch means in its associated group of switch means.

18. A digital switching arrangement as set forth in claim 17 in which said plurality of circuit paths extend as a series of parallel vertical columns through each one of said switch groups, and said second path in each switch group extends horizontally across said vertical columns, and in which the switch means for a switch group are located at the points of intersection of the second path for said switch group with said vertical columns.

19. A digital switching arrangement as set forth in claim 17 which includes at least one common control means for selectively providing control signals for said controller means in each of said switch groups, and digital link means for connecting said control signals from said common control means to a group of said first plurality of multiplexing means for selective processing over said highways to said controller means.

20. A switching arrangement as set forth in claim 19 in which at least one time slot on each highway is assigned for use in the transmission input by the processor to one of said switch groups to others of said switch groups.

21. A switching arrangement as set forth in claim 19 in which said common control includes at least a processor circuit and a memory circuit means, and in which said digital link means includes a first path for connecting said processor circuit to said multiplexing means, and a second path for connecting said memory circuit means to said multiplexing means, whereby said memory and said processor connect with each other via said switching network.

22. A digital switching arrangement as set forth in claim 19 in which said digital link means comprises at least a first and a second time division link connecting the output of said common control means to at least one of said first plurality of multiplexing means.

23. A digital switching arrangement as set forth in claim 17 which includes means connecting said first path in each switch group to its associated highway, and in which each switch group includes output means for connecting said second path therein over its associated highway to the connected one of said multiplexing means, and in which closure of only one switch means in one switch group connects the first path in the switch group which is connected to the common circuit path selected by the closed switch means to the second path in said one switch group.

24. A system as set forth in claim 17 which includes a second plurality of multiplexing means, and common control means including a first and a second processor means, a first time division link for connecting the output of said first processor means to each one of a group of said first plurality of said multiplexing means, and a second time division link for connected the output of said first processor means to each one of a group of said second plurality of said multiplexing means, a third time division link for connecting the output of said second processor means to each one of a group of said first plurality of multiplexing means, and a fourth time division link for connecting the output of said second processor means to each one of a group of said second plurality of multiplexing means.

25. A digital switching arrangement as set forth in claim 17 in which each of said highways comprises a first and a second path, and in which said multiplexing means comprises a multiplexing circuit for multiplexing the signals input over said time division link to said one path of said highway and the switch group connected thereto, and a demultiplexer circuit for demultiplexing the data transmitted by said one switch group over said second path of said highway for transmission over said time division link.

26. A digital switching arrangement as set forth in claim 17 in which each of said highways includes a first and a second highway path and said multiplexing means comprises a multiplexer circuit and a demultiplexer circuit, and in which said controller means in each switch group comprises an input time slot interchanger having an input connected over said first highway path for the switch group to the associated multiplexer circuit, and an output circuit for said input time slot interexchange connected to a predetermined one of said vertical columns, the output circuits for the different ones of said input line slot interchangers being connected to correspondingly different ones of said vertical columns, an output time slot interchanger in each switch group having its input connected to the switch means controlled by its switch group and its output connected over said second highway path to the demultiplexing circuit for the switch group, a control circuit in each switch group connected to said input and output time slot interchangers, and operating means connected to said controller circuit for selectively operating the switch means for its switch group.

27. A digital switch arrangement as set forth in claim 26 in which said operating means comprises a crosspoint control memory having its input connected to the output of said controller circuit, and a crosspoint address decoder having its input connected to the output of said crosspoint control memory, and an output circuit connected to selectively control the closure of the switch means of its switch group.

28. A digital switching system as set forth in claim 27 in which each of said controller circuits comprises a microprocessor having an input connected between said input and output time slot interchangers and said crosspoint control memories.

29. A multiple fault tolerant digital switching system comprising a set of peripherals, said set of peripherals being comprised of input/output facilities including digital trunks, analog trunks, and subscriber lines and being further comprised of control facilities including control processors and related common control equipment, digital links which serve as time division multiplex lines for carrying pulse code modulated data, one or more of said links being interconnected to each peripheral in said set of peripherals, and a switching network for switching pulse code modulated data among said digital links, said digital links being the exclusive interface between said switching network and said peripheral equipment including said digital trunks and said analog trunks.

* * * * *

UNITED STATES PATENT AND TRADEMARK OFFICE

CERTIFICATE OF CORRECTION

PATENT NO. : 3,912,873

DATED : October 14, 1975

INVENTOR(S) : Nikola J. Skaperda

It is certified that error appears in the above-identified patent and that said Letters Patent are hereby corrected as shown below:

Column 28, line 9, after "transmission" insert

-- of information --;

Column 28, line 43, "connected" should be -- connecting --.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*